US006863951B2

(12) United States Patent
Sakai

(10) Patent No.: US 6,863,951 B2
(45) Date of Patent: Mar. 8, 2005

(54) FILM KEY SHEET AND METHOD OF MANUFACTURING THE SAME

(75) Inventor: Yasushi Sakai, Iwatsuki (JP)

(73) Assignee: Polymatech Co., Ltd., Tokyo (JP)

(*) Notice: Subject to any disclaimer, the term of this patent is extended or adjusted under 35 U.S.C. 154(b) by 0 days.

(21) Appl. No.: 10/626,525

(22) Filed: Jul. 25, 2003

(65) Prior Publication Data

US 2004/0191473 A1 Sep. 30, 2004

(30) Foreign Application Priority Data

Jul. 25, 2002 (JP) ........................................ 2002-217193

(51) Int. Cl.$^{7}$ ........................... B32B 3/24; B29C 45/14; H01H 1/10

(52) U.S. Cl. ....................... 428/139; 428/132; 428/133; 264/272.11; 264/273; 264/274; 264/154; 200/512; 200/520

(58) Field of Search ................................. 200/512, 520; 428/132, 133, 139; 264/272.11, 273, 274, 154

(56) References Cited

U.S. PATENT DOCUMENTS 5,340,956 A * 8/1994 Chen .......................... 200/341
5,399,821 A 3/1995 Inagaki et al.
5,684,279 A * 11/1997 Burgett ....................... 200/5 A
6,023,033 A 2/2000 Yagi et al.
6,156,411 A 12/2000 Jennings
6,388,218 B1 * 5/2002 Ando et al. ................. 200/512
6,576,856 B2 6/2003 Masaru et al.
2004/0086687 A1 * 5/2004 Wolfe et al. ................ 428/133

FOREIGN PATENT DOCUMENTS

JP 08-156020 A1 6/1996
JP 11-191332 7/1999
JP 2002-093267 3/2002

OTHER PUBLICATIONS

EPO European Search Report for co–pending application mailed on Sep. 29, 2003.

* cited by examiner

*Primary Examiner*—William P. Watkins, III
(74) *Attorney, Agent, or Firm*—Rader, Fishman & Grauer PLLC

(57) ABSTRACT

Disclosed is a film key sheet with a key top protruding from a resin film which allows a further reduction in thickness and provides a sufficient degree of clarity in visually recognizing a display portion thereof, and a method for manufacturing such a film key sheet. The film key sheet has a film removal hole piercing through the resin film, with a hole edge portion raised from the surface of the resin film being secured to the side surface of the key top. Thus, no resin film exists on the upper and bottom surfaces of the key top, so that it is possible to achieve a further reduction in thickness independently of the foldability of the resin film and drawing accuracy and to provide clarity in visual recognition of a display portion at the bottom of the key top.

18 Claims, 12 Drawing Sheets

FILM KEY SHEET AND METHOD OF MANUFACTURING THE SAME

BACKGROUND OF THE INVENTION

1. Field of the Invention

This invention relates to a film key sheet which has a key top in a resin film and which is to be used as push-button switches of an apparatus endowed with key input function, such as an information terminal apparatus like a mobile phone and a PDA, a keyboard, and a controller for various types of apparatuses, and to a method of manufacturing the same.

2. Related Background Art

As an example of an apparatus endowed with key input function as mentioned above, FIG. 11 shows a mobile phone 1, which has a casing 2 containing a film key sheet 4 attached to a printed circuit board 3 (See FIG. 12). Attached to the back side of the film key sheet 4 is a rubber sheet 5 formed of silicone rubber, thermoplastic elastomer or the like. On the surface of the rubber sheet 5 opposed to the printed circuit board 3 are pushers 5*a* opposed to board contacts 3*a* having disc springs. And, to bring the pushers 5*a* into contact with the board contacts 3*a* to effect input operation on the mobile phone 1, key portions 7 and 8 exposed on the casing 2 are depressed.

There are fifteen key portions 7. As the cross sections thereof are shown in FIG. 12, formed in a hat-shaped sectional configuration on these key portions are key-shaped protrusions (key top protrusions) 9*a* through drawing of a resin film 9, comprising, for example, a transparent or translucent polycarbonate resin, in correspondence with the configuration of the key portions 7. On the portion of the back side of the resin film 9 where the fifteen key portions 7 are formed, colored layers 9*b* are formed by printing prior to the drawing, and the back side of the upper surface (the back surface of the upper surface) of the key-shaped protrusions 9*a* constitutes display portions 9*c* indicating characters, numerals, symbols, etc., which can be visually recognized from outside through the resin film 9. Then, inside the key-shaped protrusions 9*a*, there are formed key top main body portions 10 formed of polycarbonate resin or the like and having upper surfaces 10*a* and side surfaces 10*b* integrally secured to the inner surfaces of the key-shaped protrusions 9*a* (colored layers 9*b*). This construction of the key portion 7 is obtained by forming the key-shaped protrusions 9*a* through drawing of the resin key film 9 with the display portions 9*c* (colored layers 9*b*) formed beforehand by printing, and then performing injection molding on the key-shaped protrusions 9*a* with a molding resin forming the key top main body portions 10.

Regarding the three key portions 8, molding resin such as a transparent polycarbonate resin is injected inside the mold to predetermined positions of the resin film 9 and is allowed to cure, thereby providing a transparent, disc-like protruding key top 11. Also, on the back side of the portion of the resin film 9 where the key top 11 is provided, there are provided colored layers 9*b* formed by printing simultaneously with the colored layers 9*b* of the key portion 7. This portion provides display portions 9*d* having characters, numerals, symbols, etc., which can be visually recognized through the transparent key top 11 and the resin film under it. Mounted to the central one of the three key portions 8 is an annular directional key 13 secured to the rubber sheet 5 by adhesive 12.

Regarding apparatuses equipped with the film key sheet 4 as described above, there is an increasing demand for a reduction in thickness, and a further reduction in thickness is required of the conventional key sheet 4, too. As a method of achieving this objective, it might be possible, for example, to further reduce the height of the key top main body portions 10 of the key portion 7. It should be noted, however, that the height of the key top main body portions 10 depends on the foldability of the resin film 9 and the accuracy in the drawing by which the key-shaped protrusions 9*a* are formed by bending the resin film 9. With the current state of the art, there are limitations to a further reduction in height by this method.

Such limitations to a further reduction in height apply not only to the above-described film key sheet 4, shown as a conventional example, but also to all so-called film key sheets comprising resin films having a key top protruding therefrom, regardless of whether they are of the type which only have a key portion similar to the key portion 7 or of the type which only have a key portion similar to the key portion 8 and, further, regardless of the presence or position of a display portion.

Further, the following issue also deserves consideration. In the conventional film key sheet 4, in which the key portions 7 are formed by the resin film 9 and in which the key portions 8 are formed by the transparent key top 11, the two types of key portions can be distinguished from each other at a glance for the operator due to the differences in appearance in terms of textures and luster. Further, it is advantageously possible to achieve a multiple designs of the film key sheet 4 through the difference in appearance between the key portions 7 and 8. However, the conventional film key sheet 4 has a structural problem which makes it impossible to make a full use of this advantage. In the key top 11 of the key portions 8, the display portions 9*d* are formed on the back side of the resin film 9, so that visual recognition has to be effected not only through the key top 11 but also through the resin film 9, which means the clearness in the visual recognition of the display portions 9*d* is impaired by the presence of the resin film 9.

As a first method of solving this problem, it might be possible, for example, to form the display portions directly on the bottom surface of the key top 11 and then glue the key top to the resin film 9 by adhesive. This, however, would make it necessary to perform the positioning of the key top 11 one by one by hands to secure it at a predetermined position on the resin film 9, resulting in a very poor production efficiency. Further, in this case, the adhesive applied to the back surface of the key top 11 by means of a dispenser or the like, is normally put on a part of the back surface of the key top 11 so that it may not be squeezed out after adhesion. It is not a common practice to apply adhesive uniformly to the entire back surface of each key top 11. As a matter of fact, that measure would be very difficult to perform When illuminated from below, a film sheet obtained in that way would not provide uniform illumination property due to unevenness in the application of the adhesive. Thus, this method requires too much for the realization of a clear view of the display portions, which means it is far from being a drastic solution.

Further, as a second method of solving the above problem, it might be possible for example, as in the case of the other key portions 7, to print beforehand the display portions (colored layers) on the surface of the resin film 9 at positions corresponding to the key portions 8, and place the film in an injection mold, molding the key top 11 on the display portions (See JP 8-156020 A as a pertinent technique). That, however, would bring the display portions (colored layers) into contact with the molding resin at high temperature, resulting in the printed characters, etc. being washed away.

As a third solving method, it might be possible to use a resin film 9 of very high degree of transparency. Such a film, however, is likely to be rubbed and flawed when placed in the mold or during storage. Due to the high degree of transparency, the flaw would be so much the more conspicuous;

Then, this difficulty in obtaining clearness in the recognition of the display portions 9*d* due to the presence of the resin film 9 is experienced not only in the case of the film key sheet 4 having the two types of key portions 7 and 8 of different appearances but also in the case of a film key sheet having in a resin film exclusively a plurality of key portions of the same type as the key portions 8.

SUMMARY OF THE INVENTION

The present invention has been made in view of the above-mentioned problems in the, prior art. It is a primary object of the present invention to achieve a further reduction in the thickness of a film key sheet comprising a resin film having a key top protruding therefrom.

A secondary object of the present invention is to achieve a sufficient degree of clearness in visual recognition of the display portions of a film key sheet.

To achieve the above-mentioned objects, according to the present invention, there is provided a film key sheet comprising a resin film having a key top protruding therefrom, in which a film removal hole whose hole edge portion is raised from the resin film surface pierces through the resin film at the position where the key top protrudes therefrom, the hole edge portion being secured to the key top side surface.

In this film key sheet, in which the film removal hole is formed so as to pierce through the resin film at the position where the key top protrudes and in which the hole edge portion of the film removal hole raised from the surface of the resin film is secured to the key top side surface, no resin film exists on the upper and bottom surfaces of the key top. Thus, independently of the foldability of the resin film and the accuracy in drawing, which have been an obstruction to a reduction in the thickness of the film key sheet, it is possible to achieve a further reduction in thickness of the film key sheet (key portion).

As described above, in the film key sheet of the present invention, no resin film exists in the upper and bottom surfaces of the key top. Thus, it is impossible to form the display portions (9*d*) on the back surface of the resin film (9) under the key top (11) as in the case of the key portions (8) of the conventional film key sheet (4). In this case, the display portions are formed directly on the upper, side, and bottom surface of the key top. Then, above all, in a film key sheet according to the present invention in which display portions indicating characters, numerals, symbols, etc. are formed on the bottom surface of a key top formed of a transparent resin, it is possible to eliminate the resin film (9) under the key top (11) as in the case of the key portions (8) of the conventional film key sheet (4), and thus it is possible to obtain a sufficient degree of clearness in visual recognition of the display portions. Further, the film key sheet of this invention involves none of the problems entailed in the first through third conventional solving methods in the prior art.

As described above, in the film key sheet of the present invention, the key top side surface and the hole edge portion of the resin film are secured to each other. The present application also proposes a technique for reinforcing this securing. In the film key sheet of the present invention, protruding flow passages are formed in the resin film, and the protruding flow passages communicate with the film removal hole and allow flowing of the molten resin forming key top inside the mold, with the key top having residual portions for allowing the molten resin to cure in the protruding flow passages to be secured to the resin film.

With this arrangement, not only the side surface but also the residual portions of the key top are secured to the resin film (protruding flow passages) so that the securing area of the key top and the resin film is enlarged, thereby providing a securing force strong enough for practical use. In this case, the protruding flow passages formed in the resin film may be of a configuration such that they connect gates of the injection mold (pin gates, etc.) and the film removal hole and that they connect the air vent of the injection mold and the film removal hole.

Further, it is possible to adopt a construction in which the securing area due to the residual portions is enlarged to further reinforce the securing, with the protruding passages in the film key sheet being formed wider in the vicinity of the film removal hole.

With this arrangement, it is possible to achieve a further reinforcement in the securing of the key top to the resin film due to an enlargement in the sectional area of the base portions of the residual portions formed integrally with the key top and to an enlargement in the securing area of the residual portions with respect to the protruding flow passages.

In the film key sheet of the present invention described above, the hole edge portion may be secured so as to be substantially flush with the key top side surface.

With this arrangement, the hole edge portion of the resin film does not protrude from the side surface of the key top, so that it is possible to prevent the hole edge portion secured to the key top from coming into contact with the casing, etc., which would cause separation. Further, the thick portion of the resin film at the end of the hole edge portion is also secured to the key top, so that it is possible to achieve a further reinforcement in securing due to an enlargement in securing area.

Then, in the film key sheet of the present invention, it is also possible to adopt a construction in which the key top main portions and the upper and side surfaces of the key top main portions are coated and in which there are further provided on the back side of the resin film other key portions having display portions indicating characters, numerals, symbols, etc.

Further, the present invention provides method of manufacturing a film key sheet capable of achieving the above objects and providing effects similar to those of the film key sheet of the present invention described above. In the manufacturing method of the present invention, there are executed a drawing process for raising from the resin film surface the hole edge portion of the film removal hole piercing through the resin film at the position where the key top protrudes therefrom, and an injection molding process in which the resin film is placed in an injection mold, with the hole edge portion facing the inner surface of the cavity corresponding to the key top configuration and in which a molten molding resin is poured into the cavity through the film removal hole to form the key top.

In the film key sheet obtained by this manufacturing method, there is no resin film on the upper and bottom surfaces of the key top, so that, independently of the foldability of the resin film and the drawing accuracy, which have been an obstruction to a reduction in the thickness of the film sheet, it is possible to achieve a further reduction in the thickness of the film key sheet (key portions). Further, despite the absence of the resin film on the upper and bottom surfaces of the key top, it is possible to abolish the conventional operation of manually performing positioning on the key top one by one by hands and securing them by adhesive, thereby achieving a satisfactory production efficiency. Further, it is possible to avoid unevenness in the application of adhesive on the key top bottom surfaces, which has been an obstruction to an uniform illumination property, so that, when applied to an illumination type film key sheet, the above method provides a uniform illumination property.

The manufacturing method of the present invention may include a process for forming in the resin film protruding flow passages allowing the molten resin to flow from the side gates of the mold (pin gates, etc.) to the film removal hole. Further, the manufacturing method of the present invention may include a process for forming in the resin film protruding flow passages allowing the molten molding resin to flow from the film removal hole to the air vent of the mold. Further, in the manufacturing method of the present invention, it is possible, in the process for forming the protruding flow passages, to form the protruding flow passages so as to be wider on the film removal hole side than on the side gate side or the air vent side.

In the film key sheet obtained by such methods, it is possible to further enhance the securing force for the key top with respect to the resin film due to an enlargement in the securing area. Further, in this manufacturing method, it is not necessary for the process for forming the protruding flow passages to be a process dedicated for the purpose; since it is possible to perform the process simultaneously with the drawing process for raising the hole edge portion of the film removal hole, it is possible to rationally enhance the production efficiency.

In the above manufacturing method of the present invention, display portions indicating characters, numerals, symbols, etc. are formed on the other key top protruding portions on the back side of the resin film, and, in the above drawing process, it is possible to simultaneously perform the drawing process for raising in a key top shape from the resin film surface the portions where the other key top protrudes.

In this manufacturing method, even in the case in which there are also formed key portions (the conventional key portions 7) of the type in which the resin film is raised in a key top configuration and the molding resin is poured into the raised portions of the resin film and cured therein, it is possible to perform the drawing process for raising the resin film in key top configuration simultaneously with the drawing process for raising the hole edge portion of the film removal hole, so that it is possible to rationally enhance the production efficiency.

In the above manufacturing method of the present invention, it is possible, in the above injection molding process, to pour the molten molding resin also into the other key top portions raised in key top shape to simultaneously form key top main body portions on the back side of the resin film.

In this manufacturing method, even in the case in which there are also formed on the film key sheet key portions (conventional key portions 7) of the type in which the molding resin is poured in the portions raised in key top shape and cured therein, it is possible to perform the pouring of the molding resin simultaneously with the above-described injection molding process, so that it is possible to rationally enhance the production efficiency.

The above description of this invention should not be construed restrictively. The objects, advantages, features, and uses of this invention will become more apparent from the following description given with reference to the accompanying drawings. Further, it is to be understood that all appropriate modifications made without departing from the gist of this invention are covered by this invention.

DESCRIPTION OF THE PREFERRED EMBODIMENTS

Figure 1:
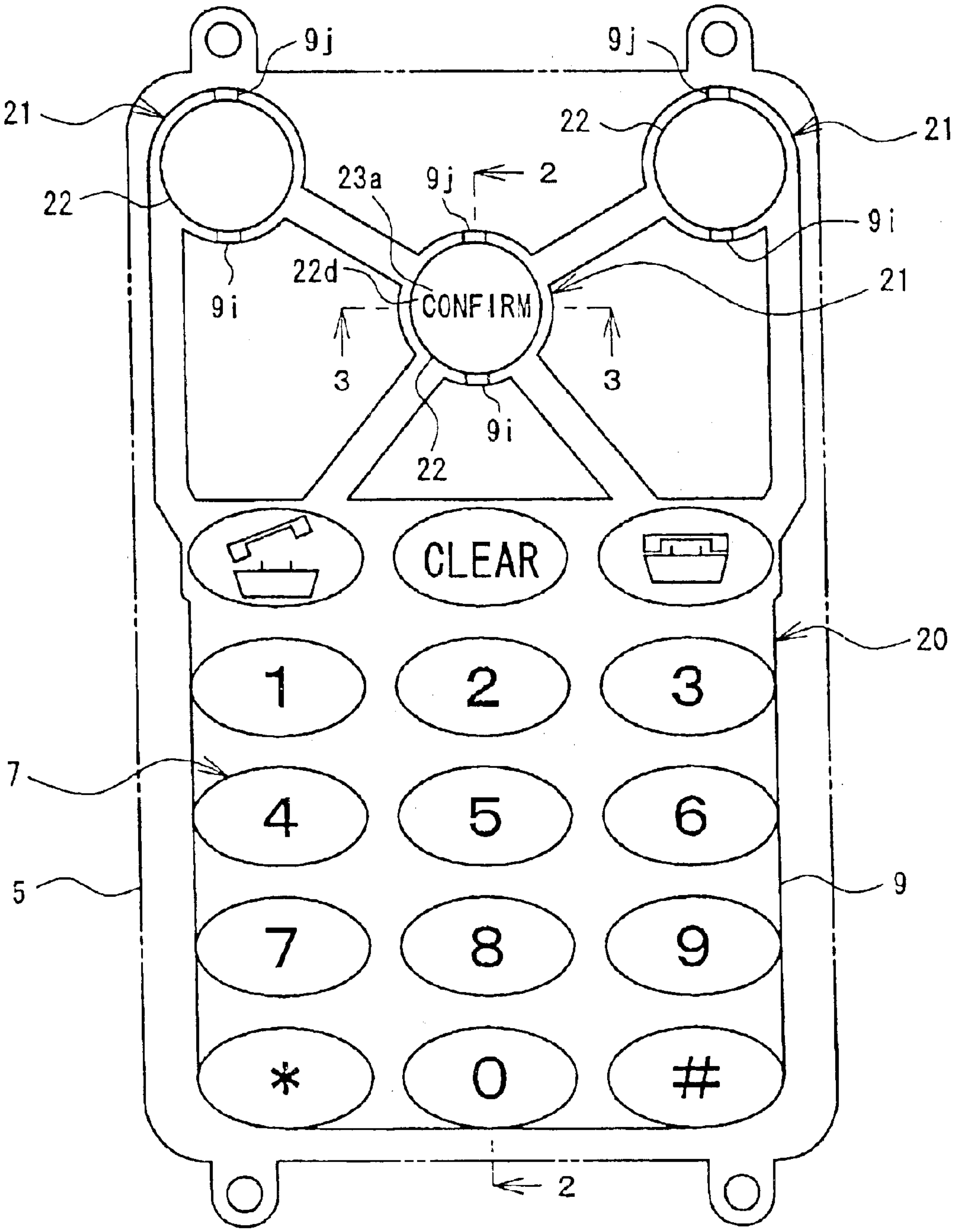
FIG. 1 is a plan view of a film key sheet according to an embodiment of the present invention.

An embodiment of the present invention will now be described with reference to the drawings. In the following, the components which are the same as those of the prior-art technique are indicated by the same reference numerals, and a description of such components will be omitted.

Figure 11:
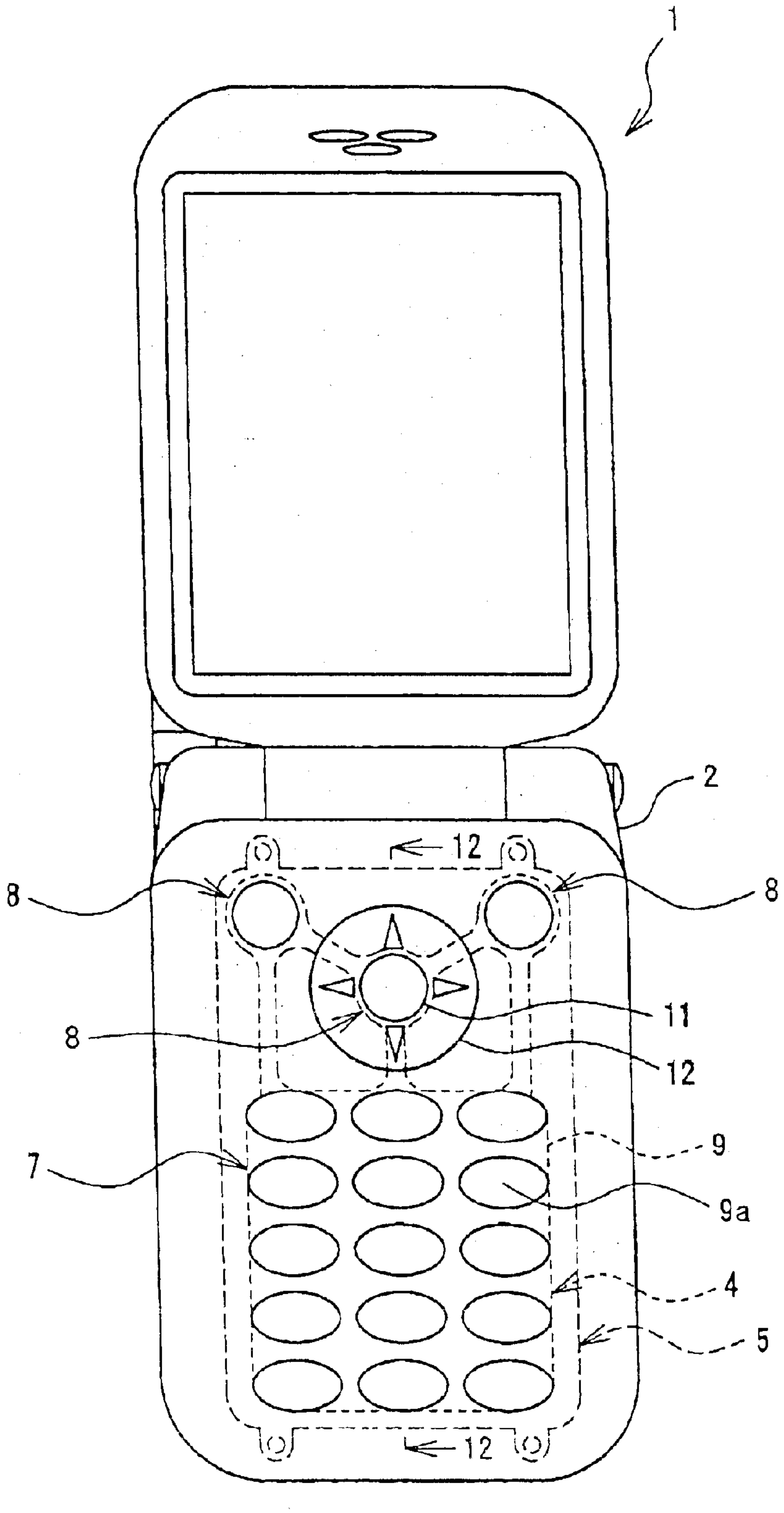
Fig.11 (Prior Art)
FIG. 11 is an outward view of a mobile phone equipped with a conventional film key sheet.
Figure 12:
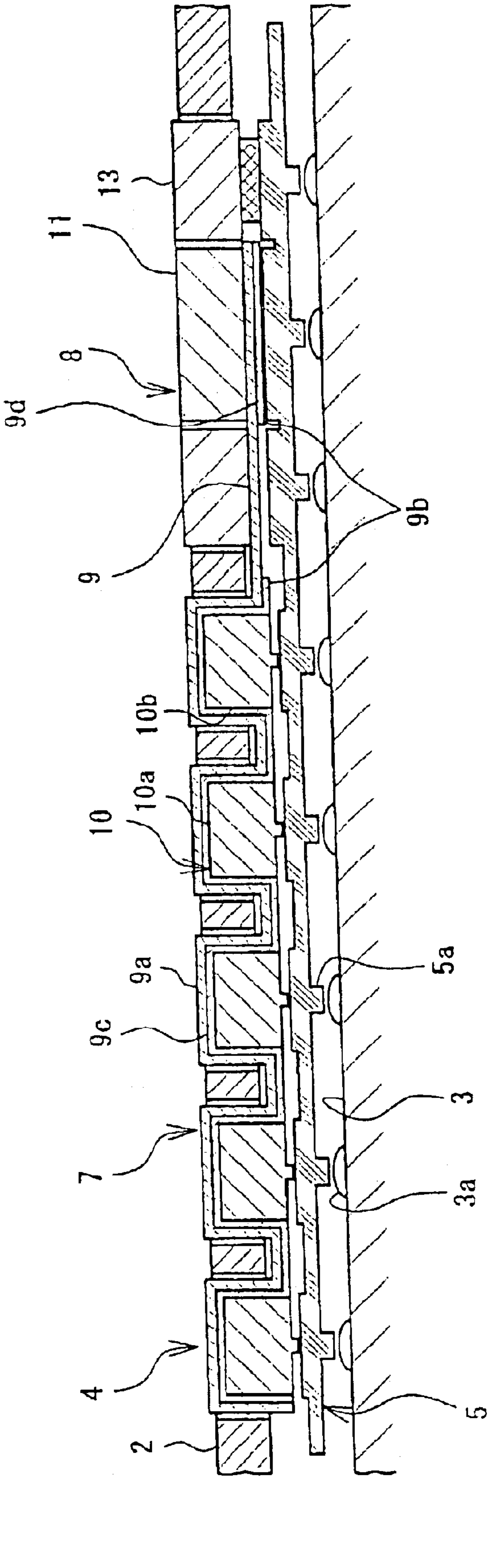
Fig.12 (Prior Art)
FIG. 12 is an enlarged sectional view taken along the line 12—12 of FIG. 11.

In particular, a film key sheet 20 of this embodiment has three key portions 21 which are different from the key portions 8 of the conventional film key sheet 4. However, the film key sheet 20 is the same as the conventional film key sheet 4 in that the material of the resin film 9 is polycarbonate, that the film is fixed to the rubber sheet 5 by adhesive for integration, that it is contained in the mobile phone 1 in the integrated state as shown in FIG. 11, that the printed circuit board 3 is situated under the rubber sheet 5 in the contained state as shown in FIG. 12.

Figure 2:
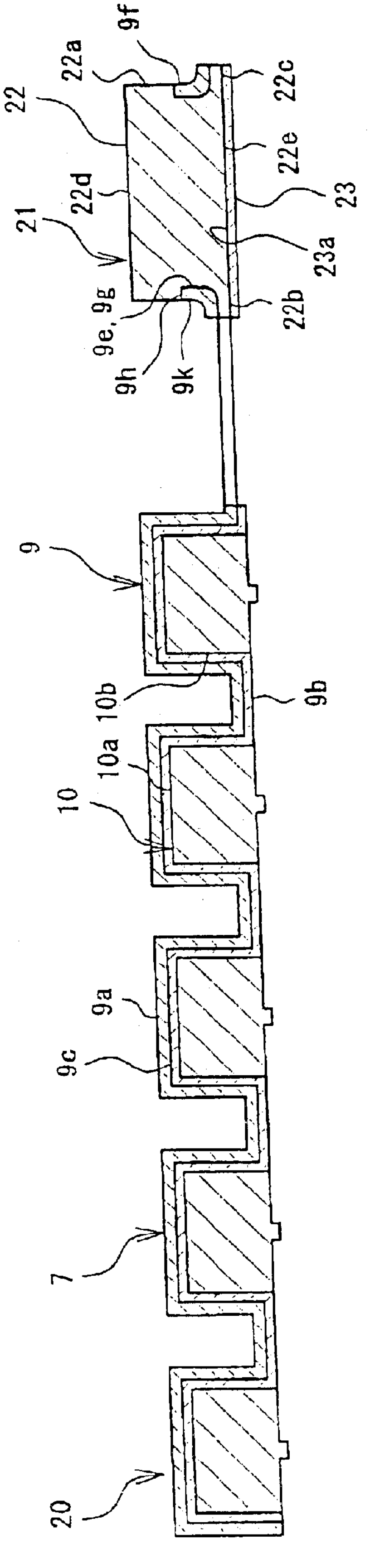
FIG. 2 is an enlarged sectional view taken along the line 2—2 of FIG. 1.
Figure 3:
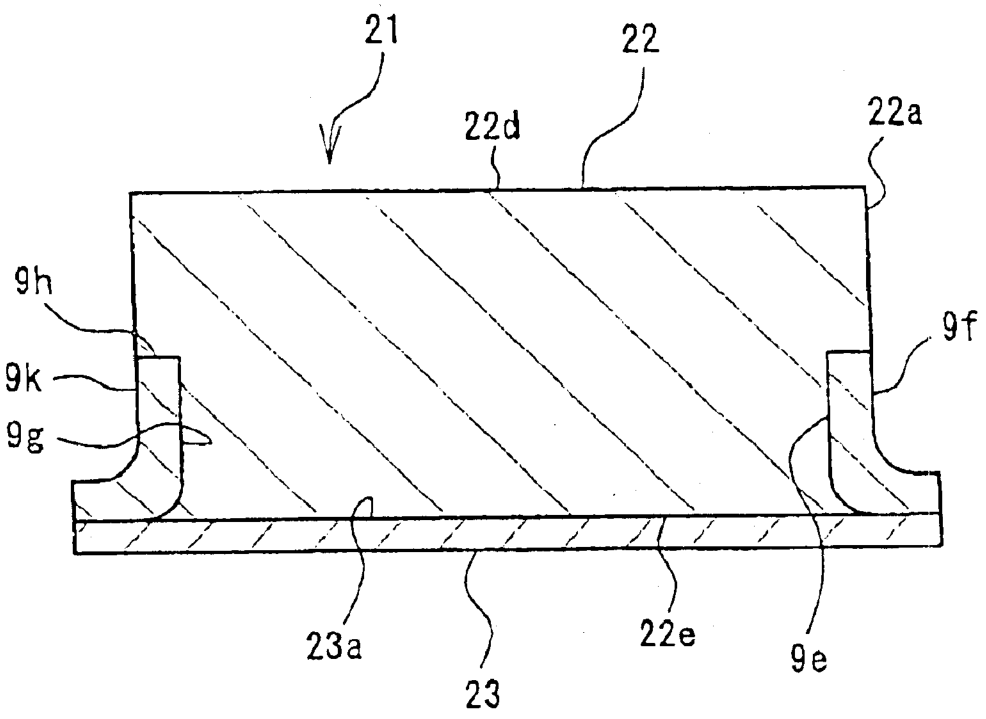
FIG. 3 is an enlarged sectional view taken along the line 3—3 of FIG. 1.

As shown in the enlarged sectional views of FIGS. 2 and 3, the resin film 9 of this embodiment has a film removal hole **9*e*, and a hole edge portion 9*f* of this film removal hole 9*e* is raised from the surface of the resin film 9. Then, the entire inner peripheral surface 9*g* of the raised hole edge portion 9*f* and the entire edge end portion 9*h* are both firmly attached to the lower end of a side surface 22*a* of a transparent key top 22 to secure such a securing area as will provide such a securing force as is strong enough for practical applications, and, in this state, the key top 22 and the resin film 9** are integrated with each other.

For a further increase in the above securing force, the resin film 9 has protruding flow passages 9*i* and 9*j* (See FIG. 6) constituting flow passages for the molten resin (polycarbonate resin in this embodiment) forming the key top 22, and residual portions 22*b* and 22*c* (See FIG. 9) cured integrally with the key top 22 are also firmly attached to the resin film 9.

As described above, if there exists no resin film 9 on the upper surface 22*d* and the bottom surface 22*e* of the key top 22, it is possible to firmly attach the key top 22 to the resin film 9 by means of the hole edge portion 9*f* and the protruding flow passages 9*i* and 9*j*, so that the resin film is free from the influence of the foldability of the resin film 9 and the accuracy in drawing, which have been an obstruction to a reduction in the thickness of the film key sheet 20, and it is possible, in this embodiment, to achieve a further reduction in the thickness of the film key sheet 20 (the key portion 21).

Then, the key top 22 is fixed to the resin film 9 such that the outer peripheral surface 9*k* of the hole edge portion 9*f* is substantially flush with the side surface 22*a* of the key top 22. Thus, the edge end portion 9*h* of the hole edge portion 9*f* does not protrude from the side surface of the key top 22, so that no external force which would separate the film sheet from the key top 22 is applied, which would be caused by contact with the casing 2, etc.

Ink is applied to the bottom surface 22*e* of the key top 22 secured to the resin film 9 to form a colored layer 23. As shown in FIG. 1, when seen from above, this colored layer 23 allows visual recognition through the transparent key top 22 of a display portion 23*a* indicating a character, numeral, symbol or the like (which, in this embodiment, is the word "CONFIRM"). Thus, it is possible to eliminate the resin film 9 under the key top 11 of the key portion 8 of the conventional film key sheet 4, so that the film key sheet 20 of this embodiment enables the display portion 23*a* to be visually recognized with sufficient clarity.

This colored layer 23 comprising a plurality of coating layers: a display layer constituting a display portion 23*a* with a colored character, numeral, symbol or the like (hereinafter referred to as a character or the like) in a desired configuration or a display portion colored by off-printing, a colored layer stacked on the display layer, and a protective layer for these layers. In fact, the colored layer 23 of this embodiment also has a three-layered construction. The resin film 9 also has colored layers 9*b* in the portion, where the key portions 7 protrude, and these colored layers have the same layer construction as the colored layer 23.

Next, a method of manufacturing the film key sheet 20 of this embodiment will be described.

Figure 4:
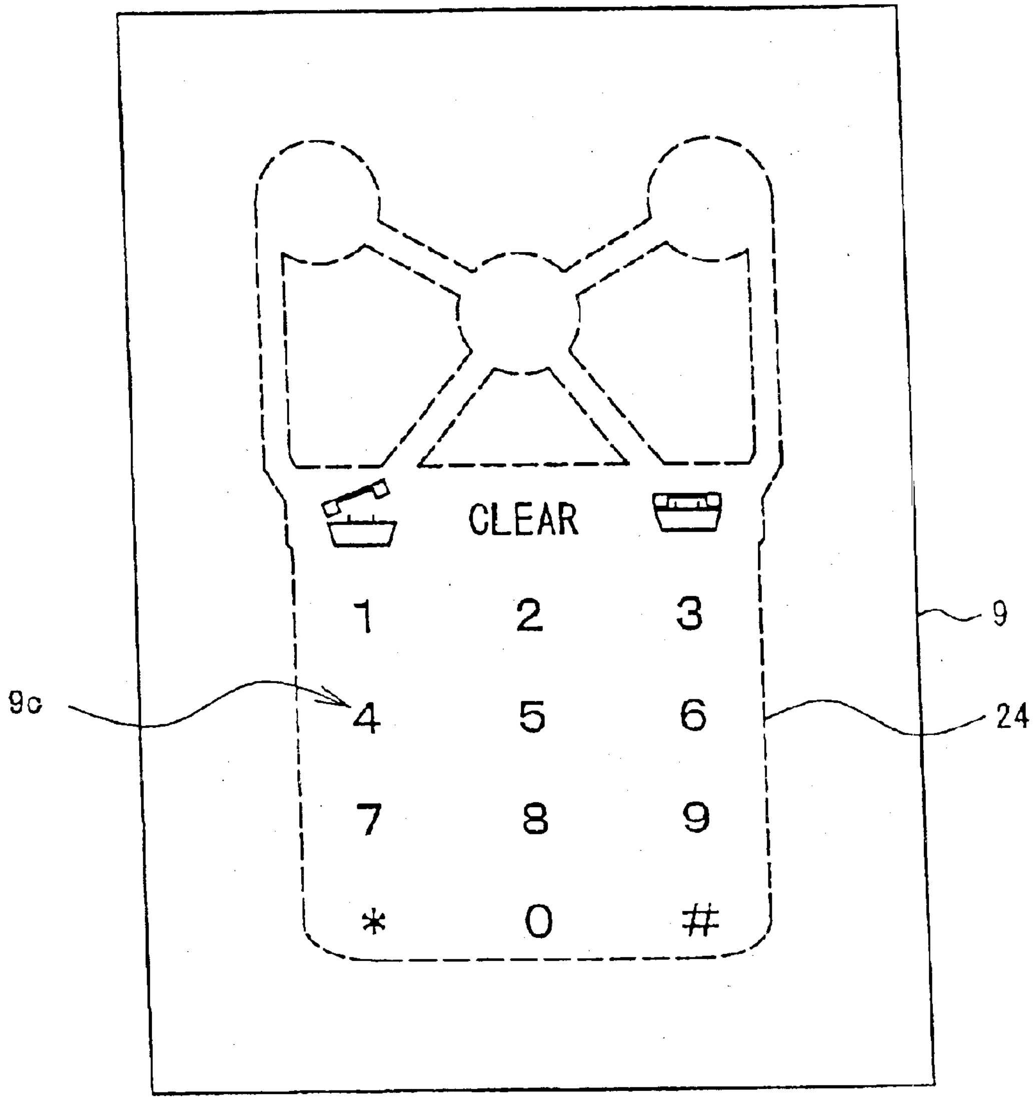
FIG. 4 is a plan view illustrating a process for manufacturing a film key sheet according to an embodiment of the present invention, showing a state in which a colored layer is formed on a resin film.

First, as shown in FIG. 4, the colored layers 9*b* are formed in the portion on the back side of the resin film 9 where the key portions 7 protrude (See FIG. 7), whereby, when seen from the front surface side thereof, the resin film 9 allows visual recognition of the display portions 9*c* corresponding to the key portions 7. The dashed line 24 indicates the cutting line for the film key sheet 20.

Figure 5:
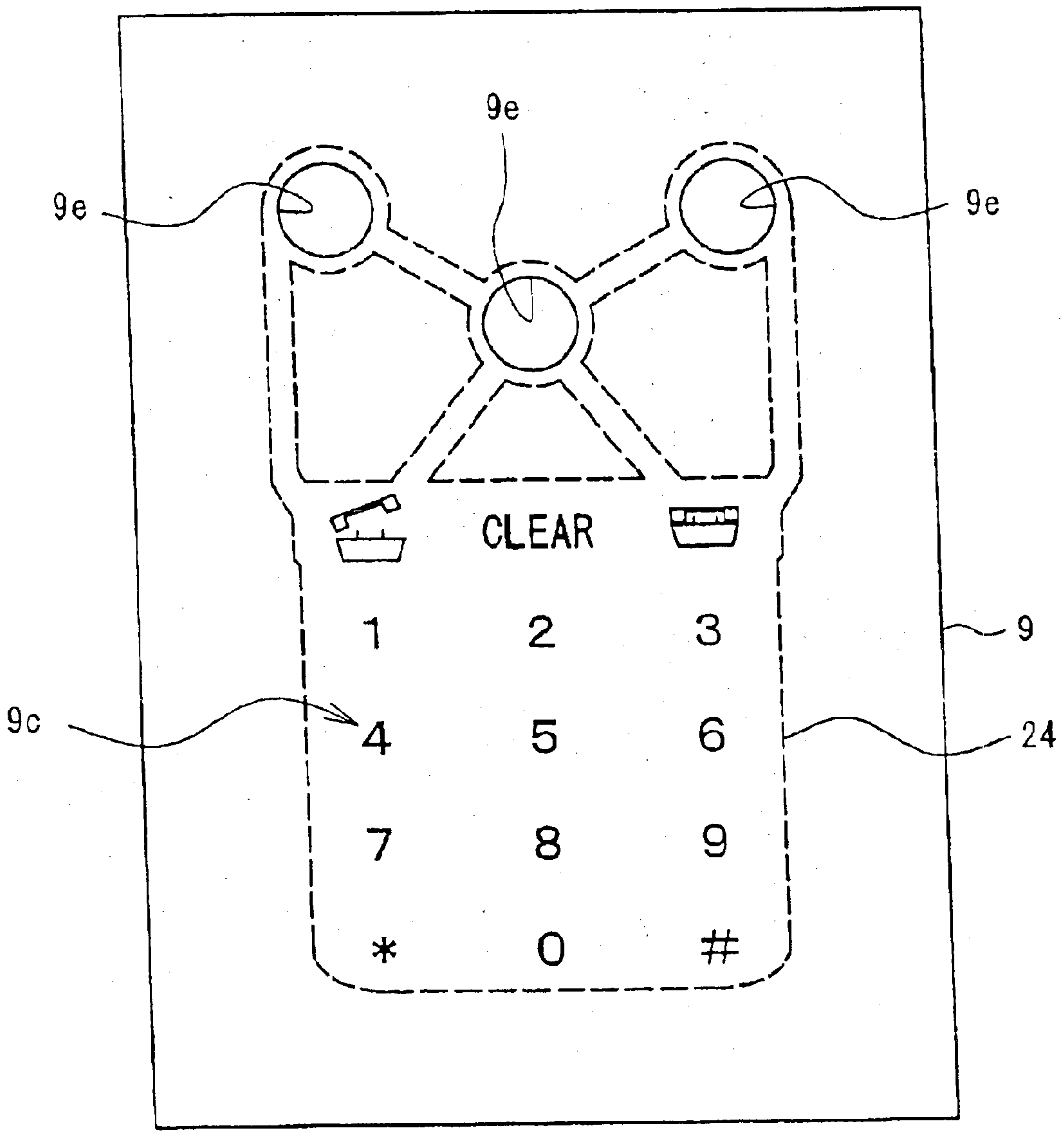
FIG. 5 is a plan view illustrating a manufacturing process subsequent to that of FIG. 4, showing a state in which film removal holes have been formed in the resin film.

Next, as shown in FIG. 5, by using a pressing machine, there is executed a process for forming film removal holes 9*e* in the resin film 9 piercing through it at the positions corresponding to the three key portions 21. In this process, the film removal holes 9*e* are formed so as to have an outer diameter somewhat smaller than that of the key top 22.

Figure 6:
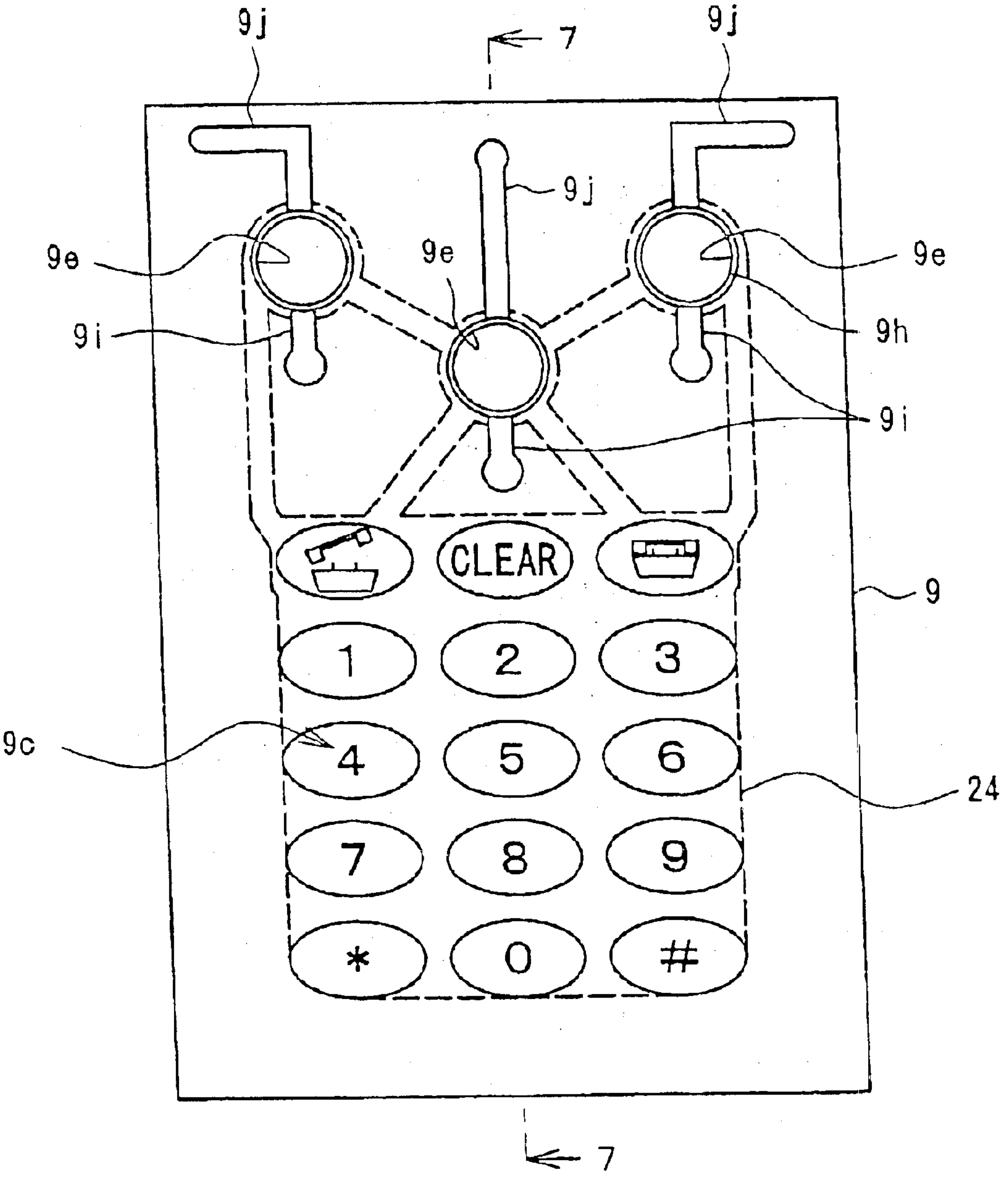
FIG. 6 is a plan view illustrating a manufacturing process subsequent to that of FIG. 5, showing a state, in which drawing has been performed on the resin film.
Figure 7:
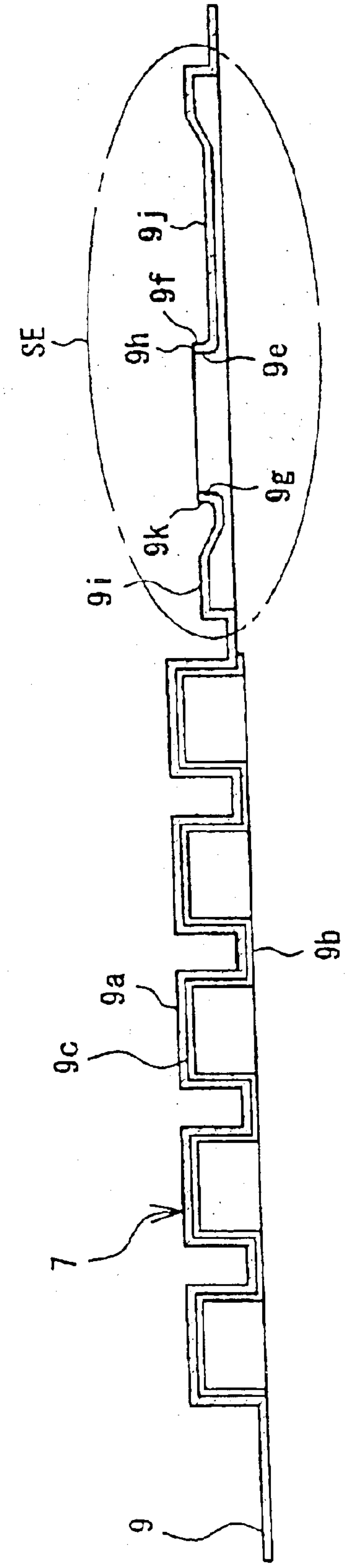
FIG. 7 is an enlarged sectional view taken along the line 7—7 of FIG. 6.

Subsequently, as shown in FIGS. 6 and 7, by using a pressing machine, drawing is performed on the resin film 9. By this drawing, there are formed key-shaped protrusions 9*a* by raising the portions corresponding to the protruding key portions 7 of which there are fifteen in total. At the same time, the hole edge portion 9*f* of the film removal hole 9*e* is raised for each key portion 21, with the edge end portion 9*h* being directed vertically upwards. At the same time, the two protruding flow passages communicating with the film removal hole 9*e* are formed so as to swell in a dome-like fashion. When the hole edge portion 9*f* of the film removal hole 9*e* has been raised, the diameter of the film removal hole 9*c* (the outer diameter inclusive of the wall thickness of the resin film 9), which has been made somewhat smaller, becomes substantially the same as the outer diameter of the key top 22.

Figure 8:
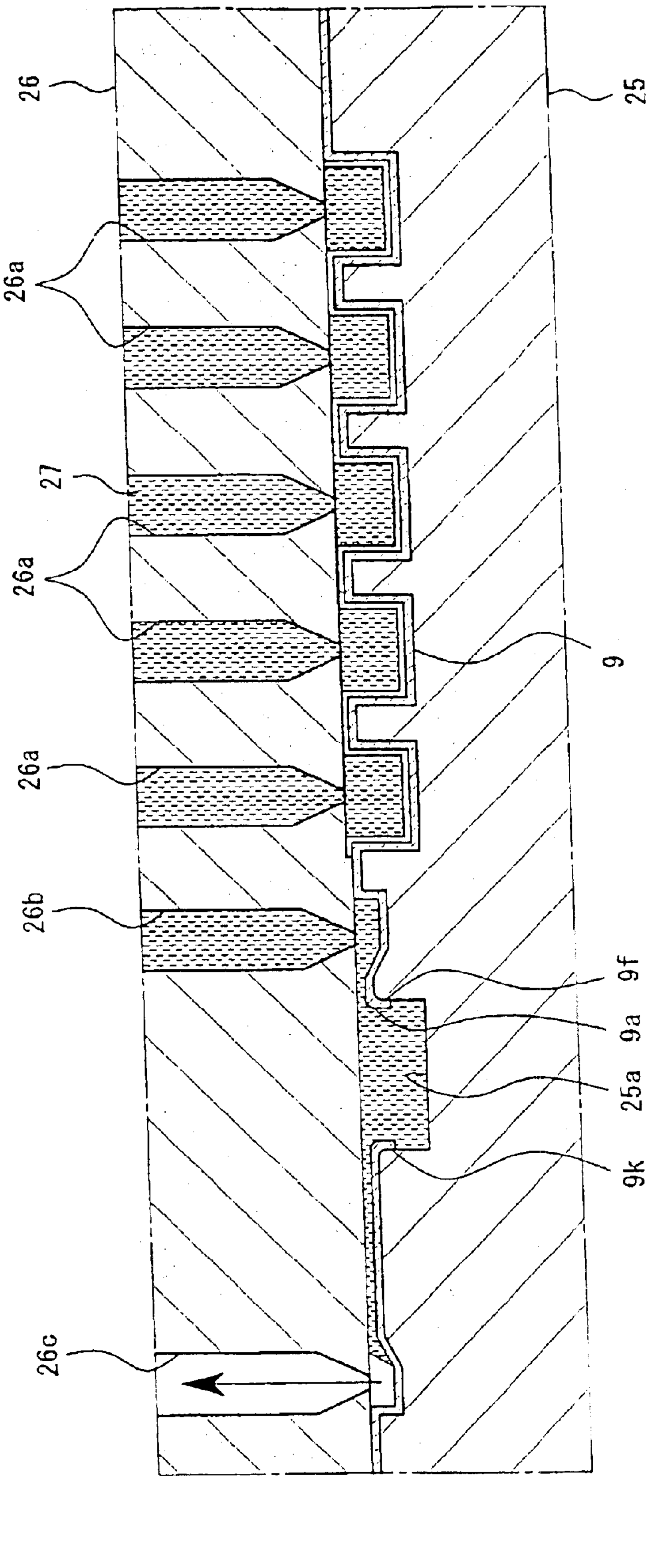
FIG. 8 is a sectional view illustrating a manufacturing process subsequent to that of FIG. 6, showing how injection molding is performed on the resin film.

Subsequently, an injection molding process using a molding resin (which is a polycarbonate resin in this embodiment) is executed. A first mold 25 shown in the lower part of FIG. 8 has a cavity 25*a* of the same configuration as the resin film 9, which has undergone the above processes. A second mold 26 shown in the upper part of FIG. 8 has a flat surface that faces the resin film 9. The mold 26 has pin gates 26*a* and 26*b* for injecting a molten molding resin 27 and an air vent 26*c*, which are open in this flat surface. First, the resin film 9 is placed in the cavity 25*a* of the first mold 25. In doing so, the outer peripheral surface 9*k* of the hole edge portion 9*f* of the resin film is caused to face the surface defining the cavity 25*a*. And, when a molten molding resin 27 is poured in through the pin gates 26*a* and 26*b*, each key-shaped protrusion 9*a* is filled with the molding resin 27. Further, the molding resin 27 injected through the pin gate 26*b* flows through the protruding flow passage 9*i* of the resin film 9 into the cavity 25*a* corresponding to the key top 22 through the film removal hole 9*e*. At this time, due to the pressure of the flowing molding resin 27, the hole edge portion 9*f* of the resin film 9 is brought into contact with the surface forming the cavity 25*a*, and no molding resin 27 reaches the outer peripheral surface 9*k* of the hole edge portion 9*f*. And, after having filled the cavity 25*a*, the molding resin flows through the protruding flow passage 9*j* into the air vent 26*c* of the second mold 26. When the molding resin 27, thus filling the cavity has been cured, the first mold 25 and the second mold 26 are separated from each other, and the resin film 9 is extracted.

Figure 9:
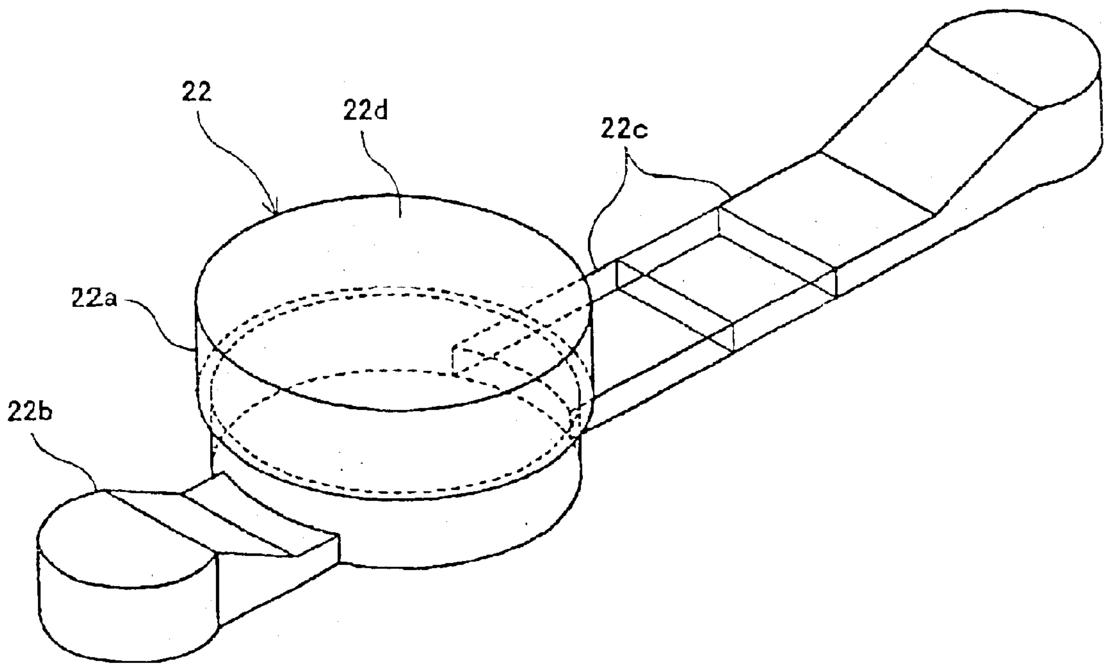
FIG. 9 is an, outward perspective view of the key top and the residual portion of the enclosed portion SE of FIG. 7 obtained through the injection molding process shown in FIG. 8.

As shown in FIG. 9, the molding resin 27 cured in the protruding flow passages 9*i* and 9*j* of the resin film 9 remains fixed to the resin film 9 as residual portions 22*b* and 22*c* formed integrally with the key top 22. Further, the border portion of the key top 22 is fused to the inner peripheral surface 9*g* and the edge end portion 9*h* of the hole edge portion 9*f* on the resin film 9. Thus, in the key top 22 of this embodiment, the residual portion 22*b* and the side, surface 22*a* are firmly attached to the resin film 9, thus providing a securing force strong enough for practical applications.

On the resin film 9 which has undergone the above injection molding, process, there is executed a process for forming the colored layer 23 directly on the bottom surface 22*e* of the key top 22, making it possible to visually recognize the display portion 23*a* with the word "CONFIRM" as shown in FIG. 1 through the key top 22. Thereafter, the resin film 9 is cut along the cutting line 24, whereby the film key sheet 20 of this embodiment as shown in FIGS. 1 through 3 is obtained.

Figure 10:
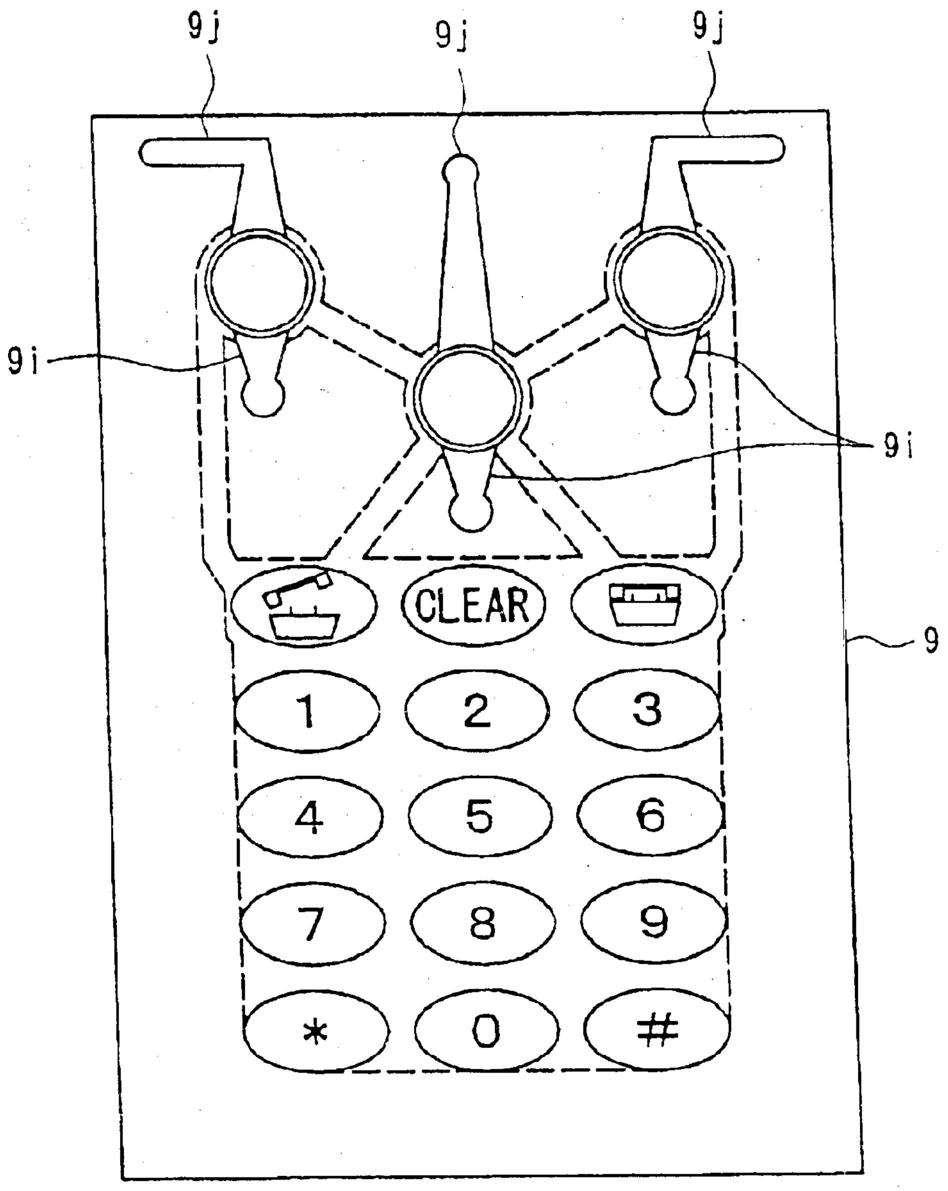
FIG. 10 is a partial enlarged view of a film key sheet according to another embodiment of the present invention.

While in the above-described embodiment the protruding flow passages 9*i* and 9*j* of the resin film 9 exhibit substantially a uniform width as they extend in the longitudinal direction, it is also possible, as shown in the enlarged view of FIG. 10, to make them wider on the film removal hole 9*e* side. This helps to enlarge the sectional areas of the base portions of the residual portions 22*b* and 22*c* with respect to the key top 22 and to further reinforce the securing of the key top 22 to the resin film 9 due to the enlargement of the securing areas of the residual portions 22*b* and 22*c* with respect to the protruding flow passages 9*i* and 9*j*.

While in the above-described embodiment both the resin film 9 and the molding resin forming the key top 22 consist of a polycarbonate resin, it is also possible for them to consist, for example, of an alloy film of polycarbonate and polybutylene terephthalate and the polycarbonate resin, respectively, or a polycarbonate film and an acrylonitrile-butadiene styrene resin, respectively, or an acrylic type film and an acrylic resin, respectively. Further, it is also possible to add a compounding ingredient improving the securing property for the resin film 9 and the key top 22 to the molding resin forming the key top 22, or, conversely, to perform a pre-processing in which an adhesive or the like improving the securing property is applied to the resin film 9. Further, for improved moldability, etc., it is naturally possible to effect addition of compounding ingredient and various kinds of pre-processing.

While in the above-described embodiment the key top 22 is formed of a colorless, transparent polycarbonate resin, it is also possible to use a colored, transparent one, a colored or colorless translucent one, or a colored, translucent one. Further, instead of providing the colored layer 23 constituting the display portion 23*a* on the bottom surface 22*e* of the key top 22, it is also possible to provide it on the upper surface 22*d*.

While the above-described embodiment includes a process for forming film removal holes 9*e* piercing through the film, it is also possible to omit the process by using a resin film 9 in which film removal holes 9*e* are formed beforehand.

While in the above-described embodiment the hole edge portion 9*f* is secured to the lower end of the side surface 22*a* of the key top 22, it is also possible to raise the hole edge portion 9*f* up to a position near the upper end so that it may cover the side surface 22*a* and then secure it to the side surface. It is to be noted, however, that the raising it too much may result in the hole edge portion 9*f* protruding beyond the upper surface 22*d* of the key top 22 in the injection molding process. Further, when the key top 22 is of the illumination type to be provided in the mobile phone 1 for illumination by an LED, the quantity of light from the side surface 22*a* could be reduced, disabling the outer periphery of the key top 22 from appearing distinctively. Thus, it is more desirable, as in the above embodiment, to secure the hole edge portion to the lower end of the side surface 22*a*.

While in the above-described embodiment the securing of the side surface 22*a* of the key top 22 to the resin film 9 is effected only for the three key portions 21, it is also possible for the other key portions 7 to have the same construction. In this case, all the key portions 7 and 21 are devoid of resin film 9 on their upper and bottom surfaces, so that it is possible to achieve a general reduction in the thickness of the film key sheet 20.

In the film key sheet and the method of manufacturing the same according to the present invention, it is possible to secure the key top to the resin film despite the elimination of the resin film at the upper and bottom surfaces of the key top, which has conventionally been used for their fixation to the resin film, Thus, it is possible to achieve a further reduction in the thickness of the film key sheet with the key top protruding from a resin film. Further, in the case in which a display portion is provided on the bottom surface of a transparent key top, the display portion can be visually recognized, with sufficient clarity since the resin film at the upper or bottom surface as allowed to exist in the conventional key top has been eliminated.

What is claimed is:

1. A film key sheet comprising a resin film, having a key portion including a key top protruding therefrom, wherein a film removal hole whose hole edge portion is raised from a surface of the resin film pierces through the resin film at a position where the key top protrude therefrom, the hole edge portion of the film removal hole being secured to a side surface of the key top.

2. A film key sheet according to claim 1, wherein protruding flow passages are formed in the resin film, through which the protruding flow passages communicate with the film removal hole and allow flowing of a molten molding resin forming the key top inside molds, and wherein residual portions are formed on the key top for allowing the molten molding resin to cure in the protruding flow passages to be secured to the resin film.

3. A film key sheet according to claim 2, wherein the protruding flow passages are formed wide in the vicinity of the film removal hole.

4. A sheet key film according to claim 2, wherein the key top is formed of a transparent resin film and have a display portion in which characters, figures, and symbols are displayed on a bottom surface, respectively.

5. A film key sheet according to claim 2, further comprising a key top main portion an upper surface and a side surface of which is coated and other key portion in which a display portion indicating characters, figures, and symbols is formed on a back side of the resin film.

6. A film key sheet according to claim 1, wherein the hole edge portion is secured so as to be substantially flush with the side surface of the key top.

7. A sheet key film according to claim 6, wherein the key top is formed of a transparent resin film and have a display portion in which characters, figures, and symbols are displayed on a bottom surface, respectively.

8. A film key sheet according to claim 6, further comprising a key top main portion an upper surface and a side surface of which is coated and other key portion in which a display portion indicating characters, figures, and symbols is formed on a back side of the resin film.

9. A sheet key film according to claim 1, wherein the key top is formed of a transparent resin film and have a display portion which characters, figures, and symbols are displayed on a bottom surface, respectively.

10. A film key sheet according to claim 9, further comprising a key top main portion an upper surface and a side surface of which is coated and other key portion in which a display, portion indicating characters, figures, and symbols is formed on a back side of the resin film.

11. A film key sheet according to claim 1, further comprising a key top main portion an upper surface and a side surface of which is coated and other key portion in which a display portion indicating characters, figures, and symbols is formed on a back side of the resin film.

12. A method of manufacturing a film key sheet having a key top formed of a resin protruding from a resin film, comprising:

executing a drawing process for raising from a surface of the resin film a hole edge portion of a film removal hole piercing through the resin film at a position where the key top protrudes therefrom; and injection molding in which the resin film is placed in injection molds of the key top, with the hole edge portion facing an inner surface of a cavity corresponding to the configuration of the key top and in which a molten molding resin is poured into the cavity through the film removal hole to form the key top.

13. A method of manufacturing a film key sheet according to claim 12, further comprising forming, in the resin film, protruding flow passages allowing a molten molding resin to flow from a side gate of a mold to the film removal hole.

14. A method of manufacturing a film key sheet according to claim 13, wherein in forming the protruding flow passages, the protruding flow passages are formed so as to be wider on the film removal hole side than on the side gate side.

15. A method of manufacturing a film key sheet according to claim 12, further comprising, forming, in the resin film, the protruding flow passages allowing the molten molding resin to flow from the film removal hole to an air vent of the mold.

16. A method of manufacturing a film key sheet according to claim 15, wherein in forming the protruding flow passages, the protruding flow passages are formed so as to be wider on the film removal hole side than on the air vent side.

17. A method of manufacturing a film key sheet according to claim 12, wherein a display portion indicating characters, figures, symbols, etc. is formed on other key top protruding portion on a back side of the resin film, and in the drawing, a drawing process for raising other key top portion in a shape of the key top from the surface of the resin film simultaneously performed.

18. A method of manufacturing a film key sheet according to claim 17, wherein, in the injection molding, the molten molding resin is also poured into the other key top portion raised in the shape of the key top to simultaneously form the key top main body portion on the back side of the resin film.

* * * * *